(12) United States Patent
Weintraub (10) Patent No.: US 6,581,165 B1
(45) Date of Patent: Jun. 17, 2003

(54) SYSTEM FOR ASYNCHRONOUSLY TRANSFERRING TIMED DATA USING FIRST AND SECOND CLOCK SIGNALS FOR READING AND WRITING RESPECTIVELY WHEN BOTH CLOCK SIGNALS MAINTAINING PREDETERMINED PHASE OFFSET

(75) Inventor: Sharon Lynn Weintraub, Encinitas, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/483,520

(22) Filed: Jan. 14, 2000

(51) Int. Cl.[7] .............................. G06F 1/04; G06F 1/12; G06F 5/06
(52) U.S. Cl. ...................... 713/600; 713/400; 713/401; 713/601; 710/52; 710/58
(58) Field of Search ................ 713/400, 401, 713/600, 601; 710/52, 58

(56) References Cited

U.S. PATENT DOCUMENTS

| | | | | |
|---|---|---|---|---|
| 4,426,685 A | * | 1/1984 | Lorentzen .................... | 713/401 |
| 4,942,553 A | | 7/1990 | Dalrymple et al. ......... | 364/900 |
| 5,199,105 A | | 3/1993 | Michael ....................... | 395/275 |
| 5,237,660 A | | 8/1993 | Weber et al. ................ | 395/250 |
| 5,262,996 A | | 11/1993 | Shiue .......................... | 365/221 |
| 5,274,600 A | | 12/1993 | Ward et al. .................. | 365/221 |
| 5,295,246 A | | 3/1994 | Bischoff et al. ............. | 395/250 |
| 5,619,681 A | | 4/1997 | Benhamida et al. ........ | 395/500 |
| 5,687,396 A | | 11/1997 | Satoh et al. ................. | 395/872 |
| 5,717,954 A | | 2/1998 | Grieff et al. ................. | 395/877 |
| 5,729,708 A | | 3/1998 | Satoh et al. ................. | 395/250 |
| 5,767,862 A | | 6/1998 | Krishnamurthy et al. ... | 345/507 |
| 5,852,380 A | * | 12/1998 | Yamauchi .................... | 327/158 |
| 5,898,744 A | | 4/1999 | Kimbrow et al. ........... | 375/376 |
| 5,991,229 A | * | 11/1999 | Kim et al. ............. | 365/230.08 |
| 5,994,920 A | | 11/1999 | Narayana et al. ............. | 326/46 |
| 6,003,118 A | * | 12/1999 | Chen ........................... | 711/167 |
| 6,006,340 A | | 12/1999 | O'Connell ................... | 713/600 |
| 6,055,285 A | * | 4/2000 | Alston ......................... | 375/356 |
| 6,259,290 B1 | * | 7/2001 | Takada et al. .............. | 327/158 |

* cited by examiner

Primary Examiner—Thomas Lee
Assistant Examiner—Michael Nieves
(74) Attorney, Agent, or Firm—Gray Cary Ware & Freidenrich; Terrance A. Meador (57) ABSTRACT

A system is provided to transfer parallel incoming data from an interface device with an external timing domain, for reading in an internal timing domain, without the use of external control signals. System constraints are reduced by permitting an infinite delay to occur in the byte clock timing through the interface device. The system tolerates a specified drift of the byte clock after initialization which may be the result of thermal changes in the interface device, for example. If the specified drift is exceeded, the system is able to reinitialize timing to reestablish the specified byte clock drift, and so continue the transfer of data from the interface device. A method of transferring data using an internal timing domain, from an interface device having an external timing domain, is also provided.

19 Claims, 8 Drawing Sheets

SYSTEM FOR ASYNCHRONOUSLY TRANSFERRING TIMED DATA USING FIRST AND SECOND CLOCK SIGNALS FOR READING AND WRITING RESPECTIVELY WHEN BOTH CLOCK SIGNALS MAINTAINING PREDETERMINED PHASE OFFSET

BACKGROUND OF THE INVENTION

The invention relates generally to the transfer of data using asynchronously timed signals and, more particularly, to a system and method that permits data from an external asynchronously timed system to be infinitely delayed with respect to internal timing.

Communication between systems necessarily involves a controlled transfer of data. Even when communicating networks use the same protocols, the two network clocks must be synched to each other, or other control signals must be used to latch the data from one network to the other. In packet data communications, such as the communication protocols used in the transfer of data across the Internet, timing is an issue in the receiver and transmitter interfaces to network interface processors.

One conventional method for latching parallel data between a first system having an external timing domain, for example a controller or framer, to a second system with an internal timing domain, such as a transmitter, has been in the implementation of propagation delay constraints. These constraints are relatively easy to abide by at low rate rates, but become more difficult to meet as the byte frequency, or rate of data transfer increases. One possible constraint is a specified maximum delay of the byte clock as it comes out of the transmit device, passes through the interface device, and returns to the transmit device. This delay needs to be less than one byte time, which is not feasible at high rates of data transfer.

An alternative method is to route the outgoing byte clock directly to the incoming byte clock of the transmit device and control the propagation delay of the byte clock to the incoming parallel data. This maximum delay also becomes difficult to meet as the byte frequency increases.

The third method is called forward clocking, in which the incoming byte clock is tied to the reference clock input. This establishes a relationship between the internal and external timing domains since the voltage controlled oscillator (VCO) locks to the reference clock. The problem with this method is that the byte clock is not a clean enough source to be used as a VCO reference clock when SONET jitter requirements need to be met.

It would be advantageous to have a method for using the clock of a first system to write data to a second system, and to use the clock of the second system to read the data from the second system.

It would be advantageous if the clock of the first system could be infinitely delayed with respect to the clock of the second system.

It would be advantageous if data could be latched through the second system as long as the clock drift between the two system clocks remained relatively constant.

It would be advantageous if the latching of data from the first system to the second system could be automatically reinitialized when the drift between the two system clocks became large enough that a danger existed of overwriting data.

SUMMARY OF THE INVENTION

Accordingly, a system is provided for transferring asynchronously timed data. The system comprises a phase error circuit to receive a first clock signal with a first frequency, and a second clock signal at the same frequency. The phase error circuit measures a phase offset between the first and second clock signals, and provides a phase error signal when a phase offset drift exceeds a specified maximum drift. The system also comprises a data transfer circuit to write and read incoming data. The data transfer circuit writes data with the second clock signal and reads the data at the first clock signal when the phase offset between the first and second clock signals is within the specified phase drift tolerance. The data transfer circuit supplies the first and second clock signals to the phase error circuit for measurement.

Typically, the data to be written is supplied by an interface circuit with a PICLK clock signal. A clock generator provides a PCLK clock signal. The first clock signal is derived from the PCLK clock signal and the second clock signal is derived from the PICLK clock signal. In some aspects of the invention the PICLK is asynchronously derived from the PCLK.

The data transfer circuit includes N banks of registers, with each register having an input to write data from the interface circuit, and an output to provide read data that is transferred. The data to be written is fanned out to the N register inputs. Then, the data is demultiplexed into the N register inputs and shifted through each register to the output using the second clock signal. An N:1 multiplexer (MUX) circuit has N data inputs connected to the corresponding register outputs, and N select inputs to receive first clock signals. The MUX multiplexes the data to be read from the N register outputs in response to the first clock signals.

A method for transferring data between asynchronously timed systems is also provided. The method comprising:
  generating a first clock having first frequency;
  generating a second clock at the first frequency having a first redetermined phase offset with respect to the first clock;
  writing data with the second clock to a bank of N registers; and reading data from the bank of N registers with the first clock;
  measuring phase offset between the first and second clocks to determine if the phase offset has drifted out of tolerance from the first phase offset by referencing a second clock edge with to a corresponding first clock edge; and
  in response to measuring the phase offset drifting out of tolerance from the first phase offset, reinitializing the generation of the first and second clocks to reestablish the first phase offset.

DETAILED DESCRIPTION OF THE PREFERRED EMBODIMENT

Figure 1:
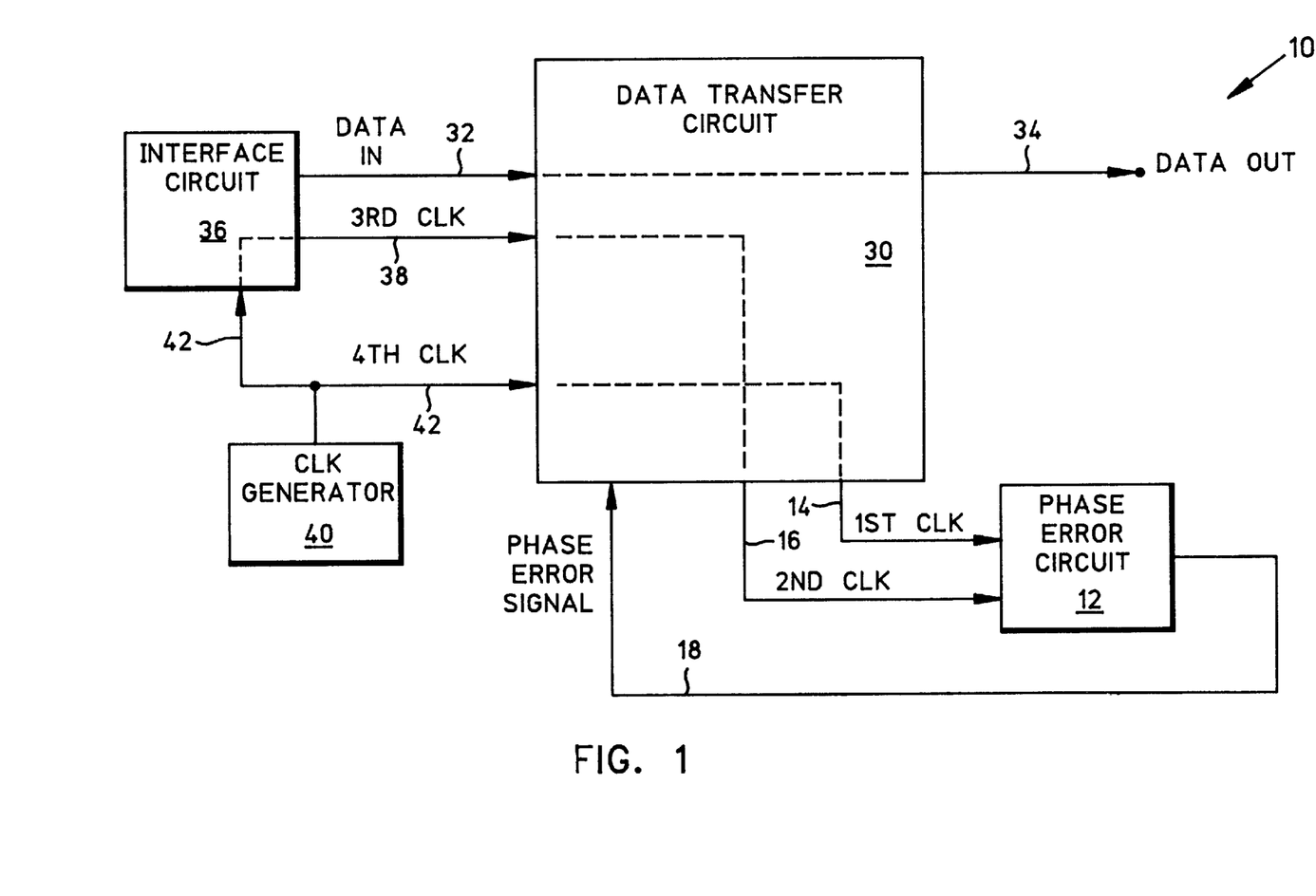
FIG. 1 illustrates a schematic block diagram of the present invention system for transferring asynchronously timed data.

FIG. 1 illustrates a schematic block diagram of the present invention system for transferring asynchronously timed data. The system 10 comprises a phase error circuit 12 having a first input on line 14 to receive a first clock signal with a first frequency. The phase error circuit 12 has a second input on line 16 to receive a second clock signal at the first frequency. The phase error circuit 12 measures the phase offset between the first and second clock signals and has an output connected to line 18 to provide a phase error signal when the phase offset drifts from a first predetermined phase offset.

Figure 2:
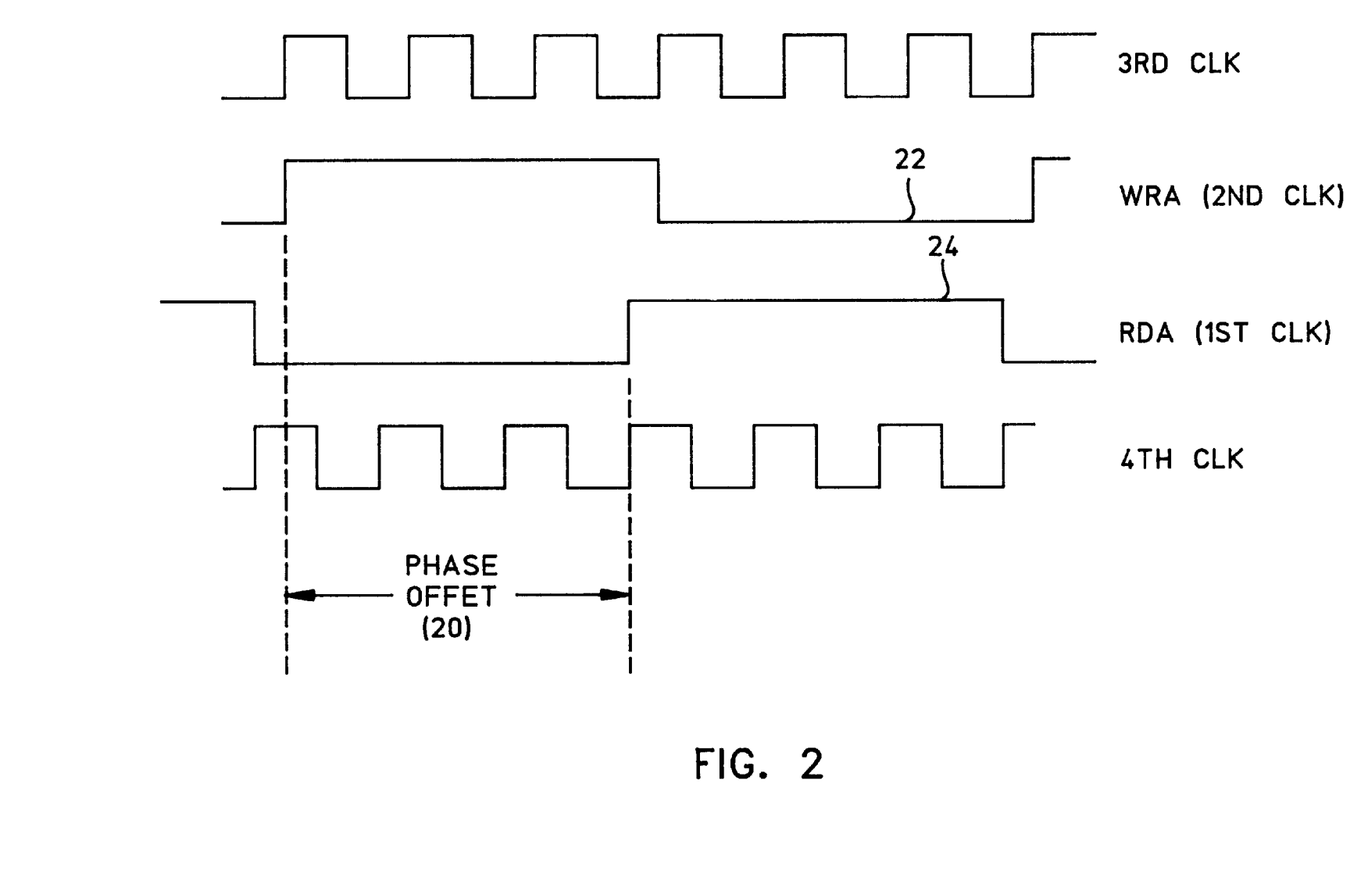
FIG. 2 is an exemplary timing diagram showing the timing relationship between the first and second clock signals.

FIG. 2 is an exemplary timing diagram showing the timing relationship between the first and second clock signals. A phase offset, labeled with reference designator 20, is shown between the rising edge second clock signal 22 and the rising edge of first clock signal 24. Alternately, the phase offset can be established from the falling edges of the clocks.

Figure 3:
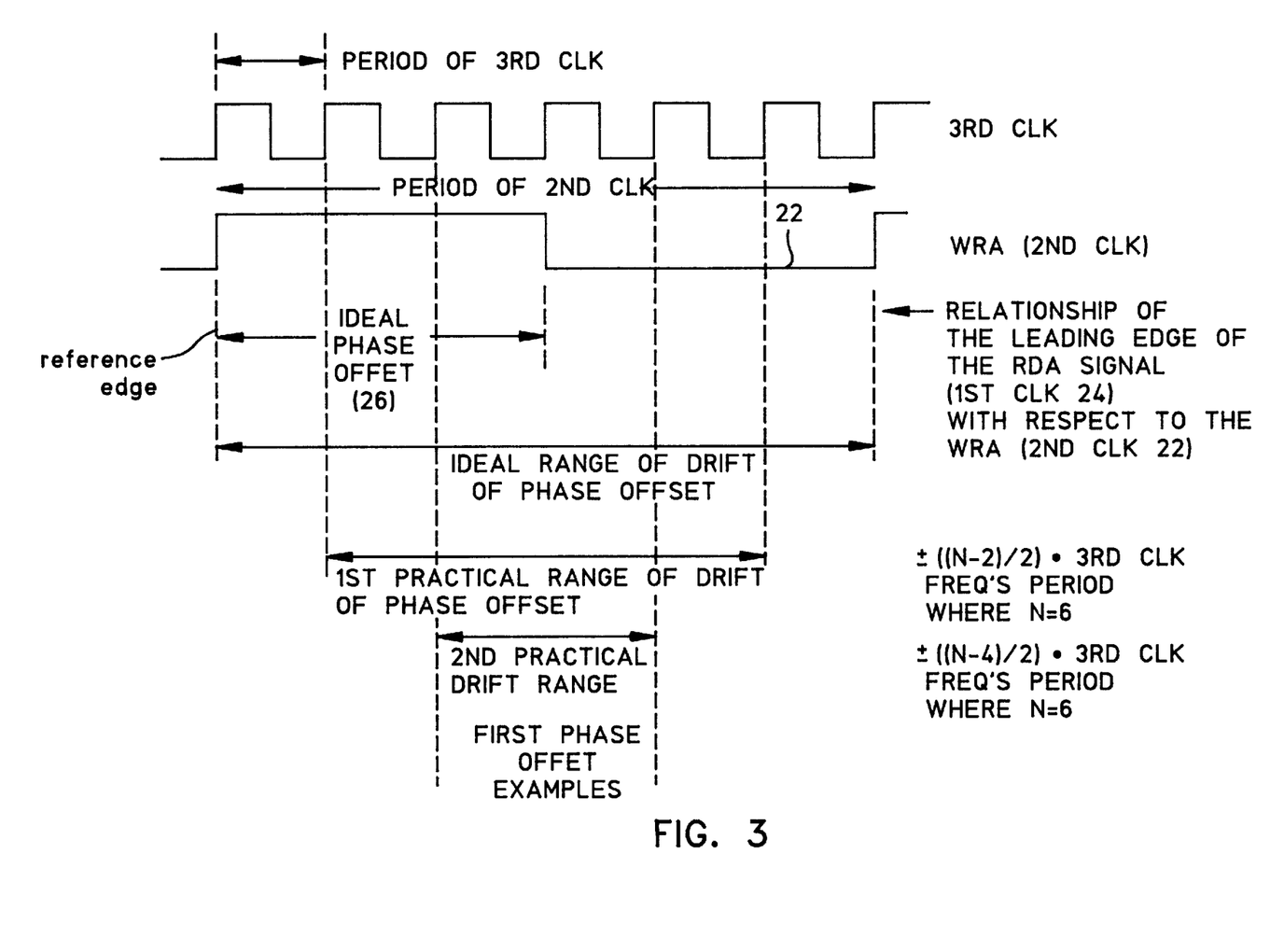
FIG. 3 is an exemplary timing diagram displaying the first phase offset.

FIG. 3 is an exemplary timing diagram displaying the first phase offset. The ideal phase offset 26 is exactly 180 degrees out of phase from the rising edge of the second clock signal 22. However, the first clock signal 24 and the second clock signal 22 are asynchronous. Therefore, the ideal phase offset is rarely achieved. Further, the system of the present invention is able to tolerate drift in the phase relationship between the first clock 24 and the second clock 22, as described in detail below.

Returning to FIG. 1, a data transfer circuit 30 has a first input on line 32 to write data, and a first output on line 34 for the reading of data. The data transfer circuit 30 has a second output connected to first input of the phase error circuit on line 14 to supply the first clock signal. Also, the data transfer circuit 30 has a third output connected to the second input of the phase error circuit on line 16 to supply the second clock signal. The data transfer circuit 30 writes the data on line 32 with the second clock signal and reads the data on line 34 with the first clock signal, when the phase offset between the first and second clock signals is the first phase offset (see FIG. 3).

An interface circuit 36 has a first output on line 32 connected to the data transfer circuit first input to provide the data to be written. The interface circuit 36 includes a second output on line 38 to provide a third clock signal having a frequency N times the first frequency.

A clock generator 40 provides a fourth clock signal on line 42 having a frequency that is N times the first frequency. The data transfer circuit 30 has a second input connected to the clock generator 40 on line 42 to accept the fourth clock signal. The data transfer circuit 30 has a third input connected to the interface circuit 36 second output on line 38 to accept the third clock signal The first clock signal is derived from the fourth clock signal, as symbolized by the dotted lines running through the data transfer circuit 30 operatively connecting the fourth clock signal input and first clock signal output. Likewise, the second clock signal is derived from the third clock signal, as symbolized by the dotted lines operatively connecting the third clock signal input and the second clock signal output. The phase error signal on line 18 is connected to the fourth input of the data transfer circuit 30.

The interface circuit 36 has an input to accept the fourth clock signal on line 42. The interface circuit 36 asynchronously derives the third clock signal from the fourth clock signal. Typically, the synchronous relationship between the third and fourth clocks is lost in random delays between clock generator 40 and interface circuit 36, in random delays between interface circuit 36 and data transfer circuit 30, and in random delays through interface circuit 36.

Typically, the data transfer circuit 30 is a first-in, first-out (FIFO) circuit, or incorporates elements of a FIFO circuit. The data input on line 32 of the data transfer circuit 30 is ultimately controlled by the third, or PICLK clock on line 38, which is also referred to as the external timing domain. The data output on line 34 of the data transfer circuit 30 is ultimately controlled by fourth, or PCLK clock on line 42, which is also referred to as the internal timing domain. The clock generator 40 is typically an internal VCO, which is divided down to produce the byte-rate clock, PCLK on line 42. When the system 10 is properly aligned, a data a byte will be sent out of the data transfer circuit 30 on line 34 approximately three byte times (for six stages of registers) after it has been written from line 32.

The use of the present invention system 10 to manage data transfer permits the routing of the fourth clock signal (PCLK) through the interface device 36, no matter how long the delay through the interface device 36. The only specification that needs to be controlled is the skew between the fourth clock (PICLK) signal on line 42 and the parallel data coming out of the interface device 36 on line 32 at the third clock (PICLK) rate. Alternately stated, the phase offset between the first and second clocks, derived respectively from the fourth and third clocks, must be controlled. After clock initialization, the third clock (PICLK) on line 38 can drift with respect to the fourth clock (PCLK) on line 42 by a specified amount, depending on the number of register banks in the data transfer circuit 30. When six registers are used (N=6), the third clock (PICLK) on line 38 can drift at least an entire byte time in either direction without danger of data corruption. This drift time can be made longer if more register banks are added to the data transfer circuit 30.

Figure 4:
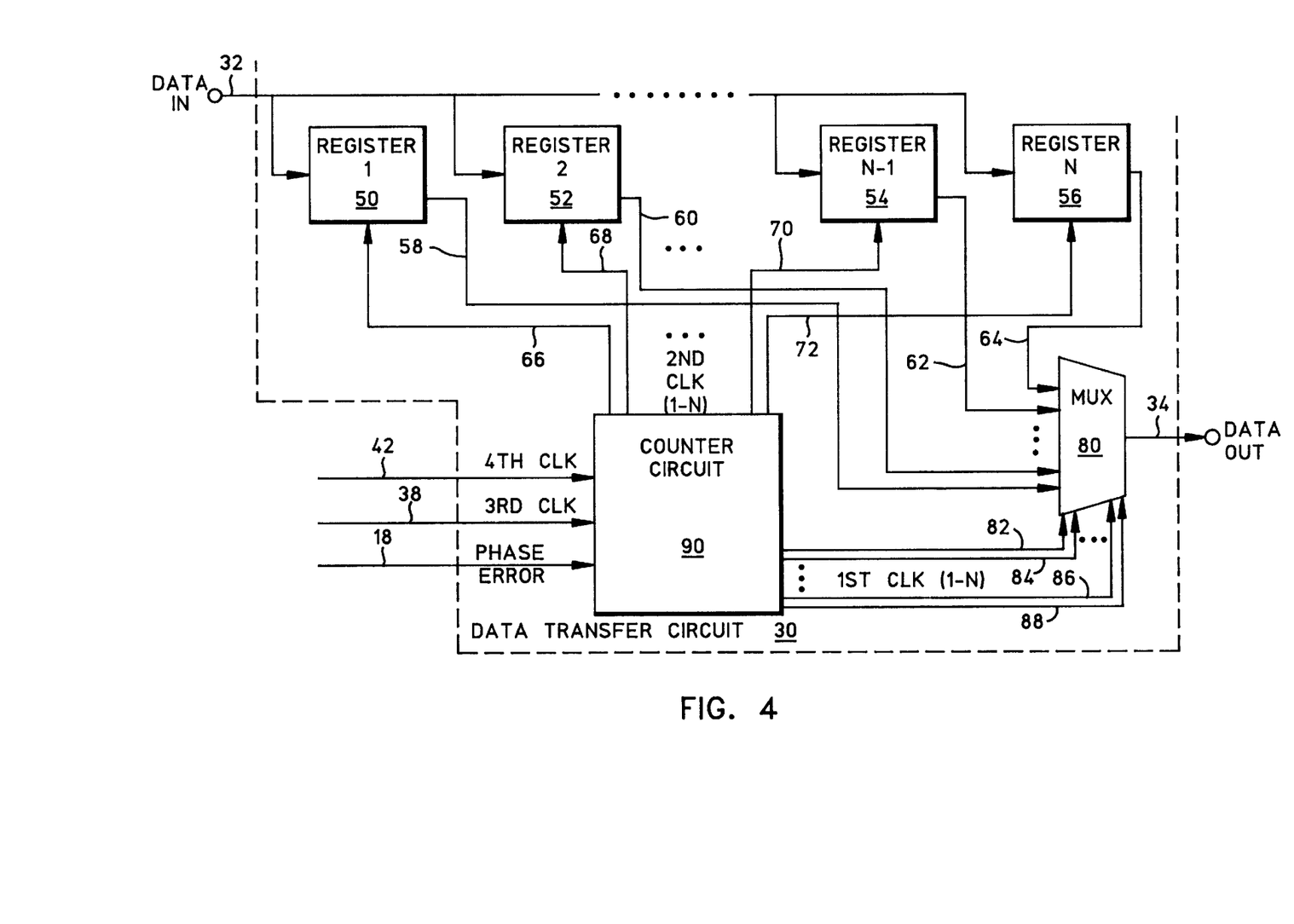
FIG. 4 illustrates details of the data transfer circuit of FIG. 1.

FIG. 4 illustrates details of the data transfer circuit 30 of FIG. 1. The data transfer circuit 30 includes N banks of registers, each register having a data input connected to the data transfer circuit first input on line 32. Four example registers are shown, they are: register 1 (50), register 2 (52), register (N−1) 54, and register N (56). The present invention is not limited to any particular number of registers, as symbolized by the dotted lines between register 2 (52) and register (N−1) 54. As described below, a larger bank of registers permits a larger phase offset to be tolerated between the first and second clock signals. Each register 50–56 has a data output on lines 58, 60, 62, and 64, respectively. The register outputs 58–64 are operatively connected to the data transfer circuit first output on line 34. Each register 50–56 has a clock input on lines 66, 68, 70, and 72, respectively, to receive the second clock signal. The input data on line 32 is fanned out to the inputs of the N register 50–56. The input data on line 32 is demultiplexed into the inputs of the N registers 50–56 and shifted through each respective register 50–56 to the respective outputs on lines 58–64 with the respective second clock signals on lines 66–72.

The data transfer circuit 30 includes an N:1 multiplexer (MUX) circuit 80 having N data inputs on lines 58–64, with each MUX data input being connected to a corresponding output of registers 50–56. The MUX 80 has a select input on lines 82, 84, 86, and 88 to receive the first clock signal and an output connected to the data transfer circuit first output on line 34. The MUX 80 multiplexes data to be read from the N register outputs on lines 58–64, to output line 34, in response to the first clock signal.

The data transfer circuit 30 includes a counter circuit 90 having a first input connected to the data transfer circuit second input on line 42 to receive the fourth clock signal. The counter circuit 90 has a second input connected to the data transfer circuit third input on line 38 to receive the third clock signal, and a third input connected to the fourth input of the data transfer circuit 30 on line 18 to receive the phase error signal. The counter circuit has a first output on lines 82–88 to provide the first clock signals and a second output on lines 66–72 to provide the second clock signals. The number of first and second clock signals correspond to the number of registers. The counter circuit 90 reinitializes the provision of the first and second clock signals to reestablish the first phase offset.

Figure 5:
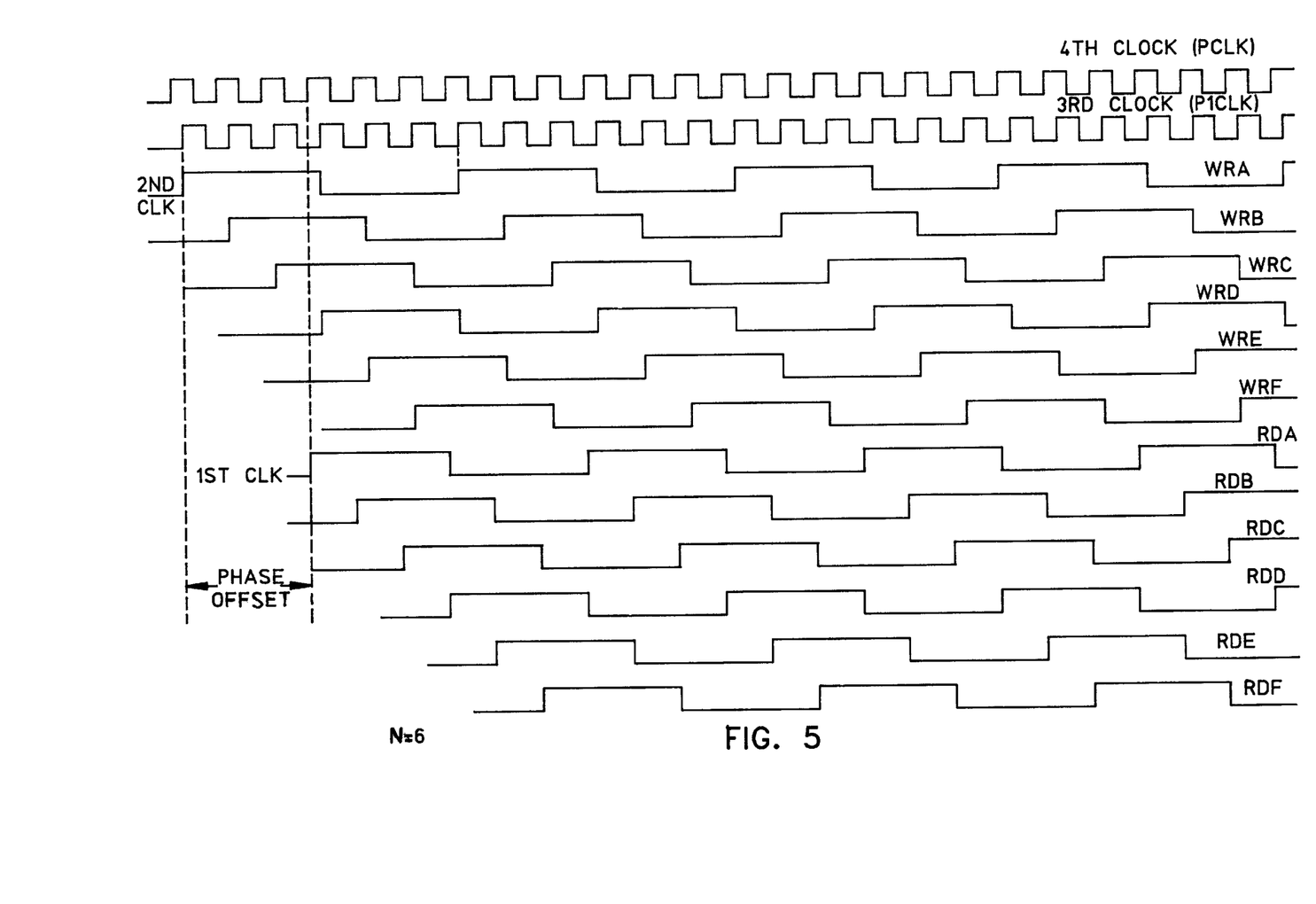
FIG. 5 illustrates the relationship between first and second clock signals with a bank of registers (N=6).

FIG. 5 illustrates the relationship between first and second clock signals with a bank of six registers (N=6). In this scenario, the registers (not shown) are labeled A through F. The six second clock signals are WRA (write register A), WRB, WRC, WRD, WRE, and WRF. Likewise, the six first clock signals.are RDA (read register A), RDB, RDC, RDD, RDE, and RDF. As shown, a phase offset exists between the WRA and RDA clocks. Maintaining the proper phase offset prevents the data in register A from being overwritten. As shown, but not specifically detailed for the other registers, the same "safe" phase offset also exists between each of these read (first) and write (second) clocks. In some aspects of the invention the phase error circuit just checks for phase error between one set of read/write signals, WRA and RDA for example. That is, the clock state of the read clocks is checked with the write clocks, or the other way around. In some aspects a write clock, WRA for example, is compared to the two closest read clocks, RDF and RDA for example. Many other similar methods of performing such a phase offset measurement will occur to those skilled in the art once the concept of the present invention is understood.

Returning to FIG. 3, it can be seen that the counter circuit 90 reinitializes the supply of the first and second clock signals so that the first clock signal 24 and the second clock signal 22 are 180 degrees out of phase, separated by a time equal to approximately ½ the first frequency's period (at which the first and second clock signals operate). Ideally, the first phase offset would be exactly ½ the first frequency's period (or exactly 180 degrees out of phase), but the first 24 and second 22 clocks are not synchronous. Alternately, it could be stated that the first phase offset causes the first clock signal 24 to lead the second clock signal 22. The phase error circuit 12 reinitializes the measurement of the first phase offset 26 in response to the counter circuit 90 supplying the reinitialized first and second clock signals, as described above. Practically, the first phase offset is a range of offsets centered around the first clock rising edge closest to being 180 degrees out of phase with the second clock rising edge reference. Alternately stated, the first phase offset is a range of phase offsets centered around the second clock rising edge closest to being 180 degrees out of phase to a reference first clock rising edge. The above-mentioned reference points can also be clock falling edges. A number of first phase offset examples, expressed as ranges centered around a 180 degrees phase shift, are shown in FIG. 3.

One advantage of the present invention is that it is able to tolerate a drift in the timing relationship between the first clock signal 24 and the second clock signal 22. That is, the phase error circuit 12 measurement of phase offset includes the first phase offset having a permitted drift. Ideally, the range of drift could be less than, or equal to +/−½ the first frequency's period (a whole period of the first frequency). However, as mentioned above, the first 24 and second 22 clocks are not synchronous and some margin must be left for the third and fourth clock, from which the second and first clocks are derived, respectively, being 180 degrees out of phase. In one aspect of the invention the first phase offset is described 180 degrees, with a permitted drift that is less than, or equal to +/−(N−2)/2 periods of the third clock signal, where the frequency of the third clock is N times the first frequency, and N equals the number of banks of registers in the data transfer circuit 30. In FIG. 3 this is shown as the first practical range of drift, in an example in which N=6. Alternately stated, the first clock edge lags the second clock reference edge by (N/2+/−(N−2)/2) third clock periods. In another aspect of the invention the first phase offset is 180 degrees with a permitted drift of less than, or equal to +/−(N−4)/2 periods of the third clock signal, or (N/2+/−(N−4)/2) third clock periods. This aspect is depicted as the second practical drift range. This definition of first phase offset permits a flag to be raised that warns the system of an impending timing problem.

It should be understood that the above-mentioned figures and explanations only describe a single data line which is written and read. The concept of system 10 is also applicable to the transfer of M parallel streams of data, in which the configuration of N banks of registers would be repeated M times, one bank of N registers for each data line. However, only N read and write clocks are required, as they are shared among the M sets of registers. That is, each parallel data line reads or writes simultaneously.

Figure 6:
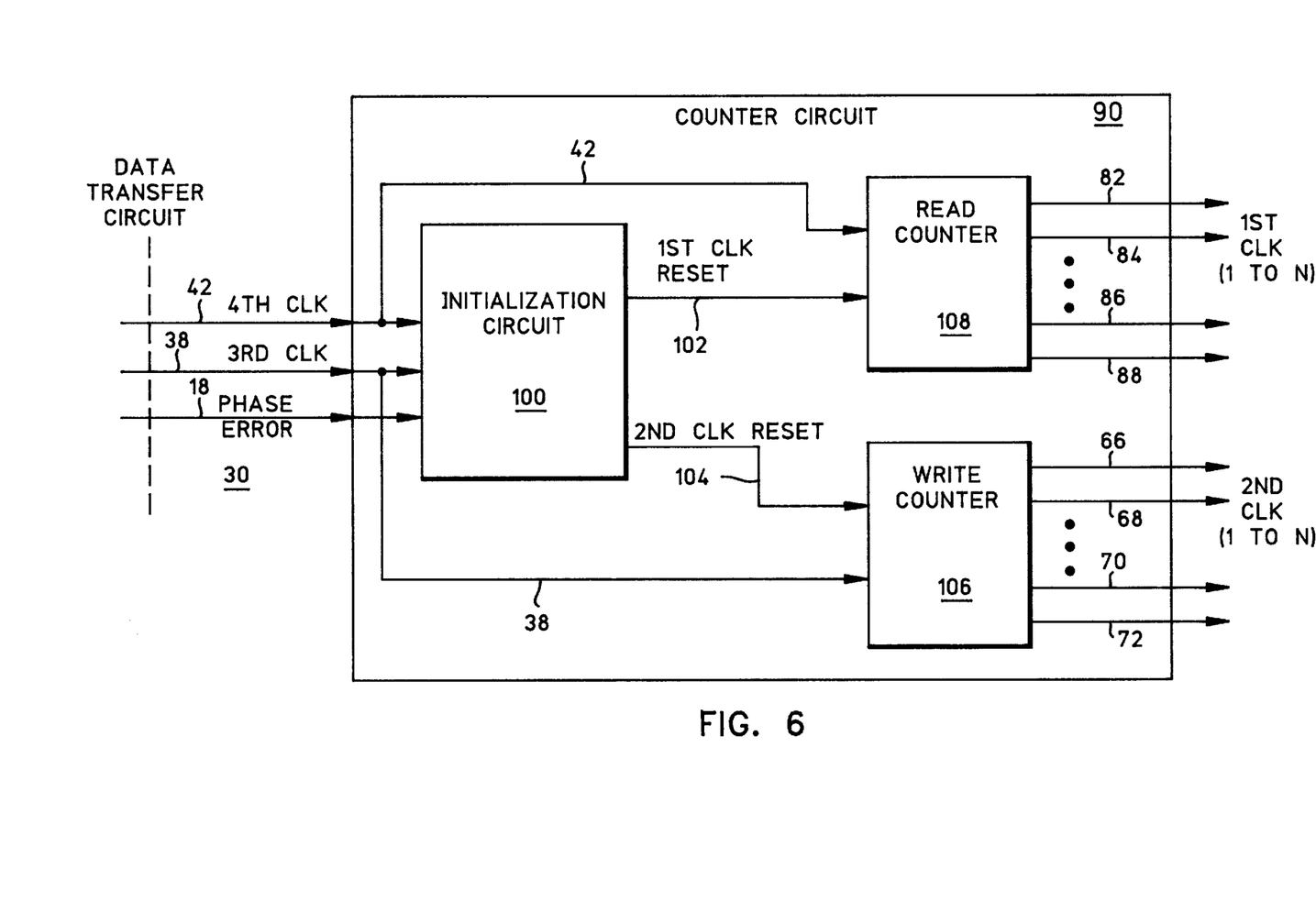
FIG. 6 is a detailed depiction of the counter circuit of FIG. 4.

FIG. 6 is a detailed depiction of the counter circuit 90 of FIG. 4. The counter circuit 90 comprises an initialization circuit 100 having a first input connected to the first input of the counter circuit 90 on line 42 to accept the fourth clock signal, a second input connected to the second input of the counter circuit 90 on line 38 to accept the third clock signal, and third input connected to the third input of the counter circuit 90 on line 18 to accept the phase error signal. The initialization circuit 100 has a first output on line 102 to provide the first clock reset signal and a second output on line 104 to provide a second clock reset signal. The initialization circuit 100 providing reset signals on lines 102 and 104 in response to the phase error signal on line 18.

A write counter 106 has a first input connected to the initialization circuit second output on line 104 to receive second clock reset signal and a second input connected to the second input of the counter circuit 90 on line 38 to accept the third clock signal. The write counter 106 divides the third clock signal by N, to create N second clock signals 66–72, offset by a time equal to the first frequency's period divided by N (one period of the third clock). The relationship between the N second clock signals is depicted in detail in FIG. 5 in an example in which N=6. The write counter 106 has N outputs to provide a different second clock signal to each of the N registers, as shown in FIG. 4. The write counter 106 reinitializes the supply of the N second clocks 66–72 in response to receiving the second clock reset on line 104, providing N second clock signals at a first phase which can be considered the second clock reference edge.

A read counter 108 has a first input connected to the output of the first initialization circuit 106 on line 102 to receive the first clock reset signal and a second input connected to the first input of counter circuit 90 on line 42 to accept the fourth clock signals. The read counter 108 divides the fourth clock signal by N, to create N first clock signals offset by a time equal to the first frequency's period divided by N (one period of the fourth clock). Once again, the relationship between the above-described first clock signal (read clock signals) 82–88 is depicted in FIG. 5.

Returning briefly to FIG. 4, the MUX 80 has N select lines connected to lines 82–88 to select an output to be read from each of the N registers 50–56. The read counter 108 (FIG. 6) has N outputs on lines 82–88 to provide a different first clock signal to each of the N MUX selects. The read counter 108 reinitializing the supply of the N first clocks 82–88 in response to receiving the first clock reset signal on line 102, providing N first clock signals at a second phase, approximately 180 degrees different than the first phase of the second clock signals. The establishment of the first phase offset, in which the first and second clocks are 180 degrees out of phase, is depicted in FIG. 3. The edge of phase error signal on line 18 triggers lines 102 and 104, in processes internal to initialization circuit 100, so that the write counter 106 and the read counter 108 reset the second and first clocks, respectively, 180 degrees out of phase from each other.

Figure 7:
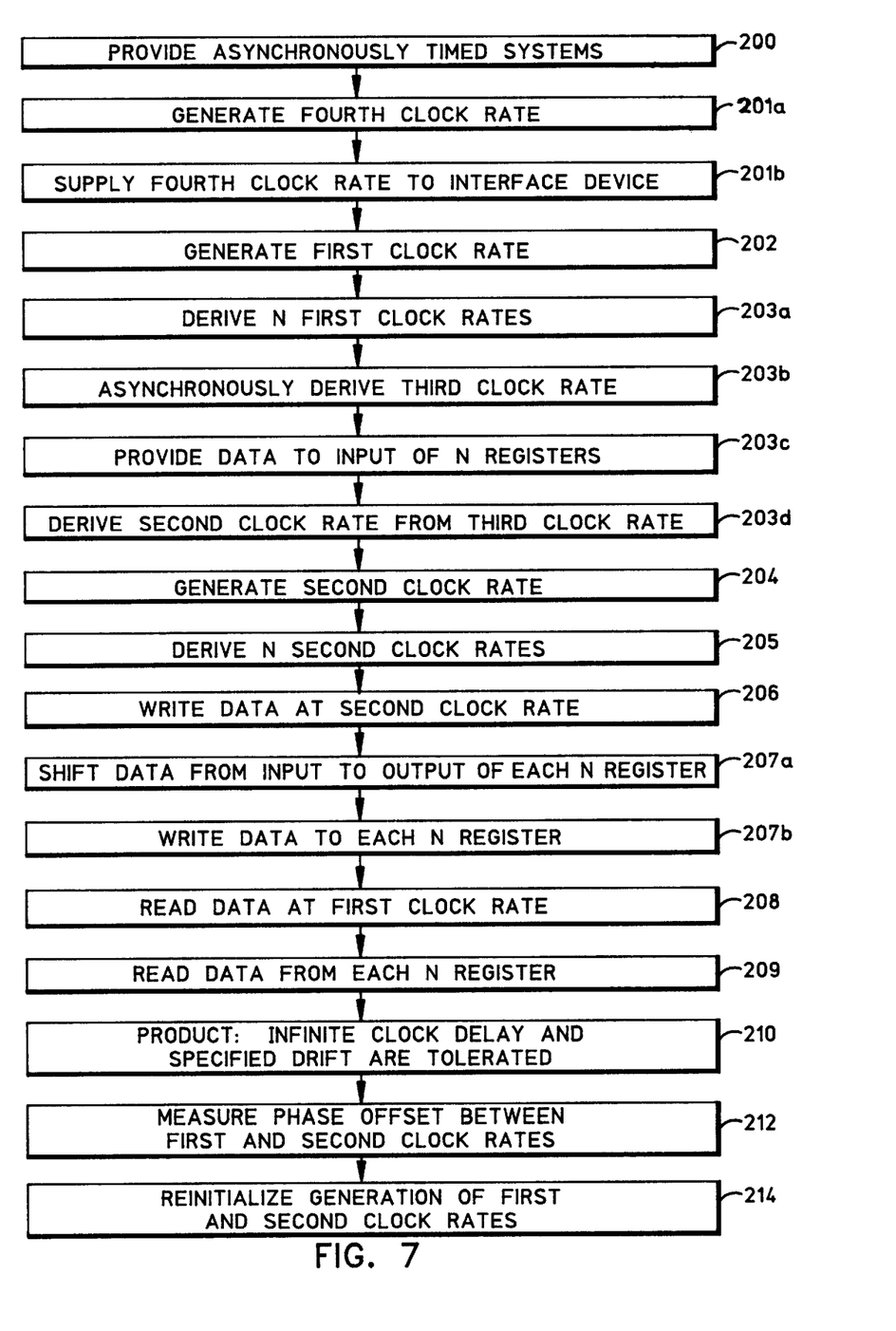
FIG. 7 is a flowchart illustrating the present invention method for transferring data.

FIG. 7 is a flowchart illustrating the present invention method for transferring data. Although the method is described herein as a series of numbered steps for the sake of clarity, no order should be inferred from the numbering unless explicitly stated. Step 200 provides asynchronously timed systems. Step 202 generates a first clock rate having first frequency. Step 204 generates a second clock rate at the first frequency having a first predetermined phase offset with respect to the first clock rate. The first and second clock rates, and the first phase offset are shown in FIGS. 3 and 5. Returning to FIG. 7, Step 206 writes data at the second clock rate, and Step 208 reads data at the first clock rate. Step 210 is a product in which an infinite clock delay and specified clock drift are tolerated in the transfer of data.

Figure 8:
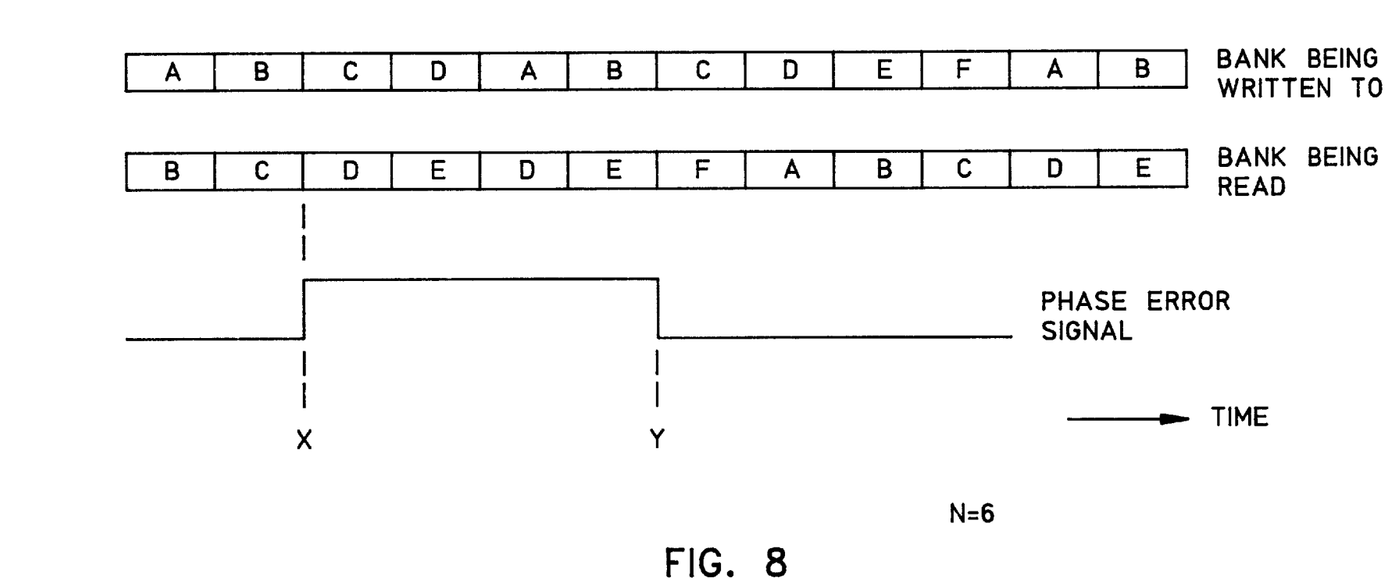
FIG. 8 describes a scenario in which the phase error between the first and second clock signals has exceeded specified phase offset drift requirements, triggering clock reinitialization.

FIG. 8 describes a scenario in which the phase error between the first and second clock signals has exceeded specified phase offset drift requirements, triggering clock reinitialization. The top row represents data being written (demultiplexed) into the bank of N registers in which N=6 (registers A through F). The second row represents the data being read from the bank of N registers (A through F). At time "X" the phase offset exceeds the range described as the first phase offset. At this point in time the system is close to reading from a bank, before the process of writing to that same bank is complete. Specifically, the system is close to reading data from bank "C" as it is writing data into bank "C". The phase error signal causes the first and second clocks (read and write clocks) to reinitialize as described above in the explanations of FIGS. 3 and 6. At time "Y" the reinitialization of clocks is complete. At time "Y", bank "C" is being written and bank "F" is being read. The difference between the read/write banks is three banks out of a total of six banks, and corresponds to the first and second clocks being 180 degrees out of phase. This is the optimum condition for preventing overwriting errors.

During the reinitialization process the danger exists that information being written to the data transfer circuit 30 is being corrupted due to clock drift. In some aspects of the invention the phase error signal on line 18 (see FIG. 1) is connected to the data transfer circuit 30 through the interface circuit 36 (not shown). This alerts the interface circuit 36 that the data transfer circuit 30 is operating within one clock bit (fourth clock) of corruption. After transferring the current block of data, the interface circuit 36 may elect to pass on the phase error signal to the data transfer circuit 30 to reinitialize the first and second clocks for a new block of data.

Returning to the flowchart of FIG. 7, Step 200 provides a bank of N registers having inputs and outputs, as shown in FIG. 4, The writing of data in Step 206 includes fanning the data out to the inputs of the N registers, and demultiplexing the data into the N registers at the second clock rate. Then, a further step, Step 207a, shifts the data from the input, to the output, of each of the N registers at the second clock rate. The reading of data in Step 208 includes multiplexing the data from the outputs of the N registers.

Some aspects of the invention include further steps. Step 212 measures phase offset between the first and second clock rates to determine if the phase offset has drifted from the first phase offset. As explained above, the first phase offset is actually a permitted range of phase offsets that is centered around a 180 degree phase offset. Step 214, in response to the measuring the phase offset drift from the first phase offset made in Step 212, reinitializes the generation of the first and second clock rates to reestablish the first phase offset.

The measurement of the phase offset drift from the first phase offset in Step 212 includes comparing a second clock reference edge to a corresponding first clock edge. The reinitialization of the first and second clock rates to reestablish the first phase offset in Step 214 includes reselecting a first clock edge for comparison to a second clock edge. Alternately, a second clock edge could be reselected for comparison to a first clock edge, or both first and second clock edges are reselected. Typically, the reinitializing the first and second clock rates in Step 214 includes reselecting a first clock edge occurring approximately ½ the first frequency period after the second clock reference edge. That is, the first clock edge is selected to be approximately 180 degrees out of phase with the second clock reference edge.

In some aspects of the invention a further step, Step 201a, generates a fourth clock rate having a frequency N times the first frequency. Then, the generation of the first clock rate in Step 202 includes deriving the first clock rate from the fourth clock rate.

Some aspects of the invention include further steps. Step 203a derives N first clock rates, one first clock rate for each bank of N registers, with each of the N first clock rates offset from another first clock rate by a time equal to the first frequency's period divided by N (which is period of the fourth clock). Step 205 derives N second clock rates, one second clock rate for each bank of N registers, with each of the N second clock rates offset from another second clock rate by a time equal to the first frequency's period divided by N (which is also the period of the third clock). Step 207b writes data to each of the N registers with its corresponding second clock rate, and Step 209 reads data from each of the N registers with its corresponding first clock rate.

In some aspects of the invention Step 200 provides an interface device. A further step, Step 201b, supplies the fourth clock rate to an interface device. Step 203b asynchronously derives a third clock rate, having a frequency N times the first frequency, from the fourth clock rate. Step 203c provides the data to the input of the N registers from the interface device at the third clock rate, and Step 203d, derives the second clock rate from the third clock rate.

The generation of the second clock rate having the first phase offset in Step 204 includes the first phase offset being 180 degrees with a margin of error, or tolerance of less than, or equal to $+/-((N-2)/2)$ periods of the third clock rate frequency. As explained above, the second clock is derived from the third clock, and the third clock rate frequency is N times the second clock rate frequency, where N is equal to the number of register banks. In some aspects of the invention the generation of the second clock rate having the first phase offset in Step 204 includes the first phase offset being 180 degrees with a margin of error, or tolerance of less than, or equal to +/−((N−4)/2) periods of the third clock rate frequency.

A system and method have been described which permit data to be transferred between systems using asynchronous clocks. The invention permits the write clock to be infinitely delayed from the read clock. The invention permits a certain amount of drift between timing signals, and automatically reinitializes timing to establish an optimal offset between read and write clocks, if the clock drift becomes excessive. Other embodiments and variations of the above-described invention will occur to those skilled in the art.

What is claimed is:

1. A method using a bank of N registers having inputs and outputs for transferring data between asynchronously timed systems, the method comprising:

generating a first clock signal having first frequency;

generating a second clock signal at the first frequency and having a first predetermined phase offset with respect to the first clock signal;

fanning data out to the inputs of the N registers, and demultiplexing the data into the N registers in response to the second clock signal;

shifting the data from the input, to the output, of each of the N registers in response to the second clock signal;

multiplexing the data from the outputs of the N registers;

measuring a phase offset between the first and second clock signals to determine if the phase offset has drifted from the first phase offset;

in response to measuring the phase offset drift from the first phase offset, reinitializing the generation of the first and second clock signals to reestablish the first phase offset.

2. The method of claim 1 in which the measurement of the phase offset drift from the first phase offset includes comparing a second clock reference edge to a corresponding first clock edge; and in which reinitializing the first and second clock signals to reestablish the first phase offset includes reselecting a first clock edge for comparison to a second clock edge.

3. The method of claim 2 in which reinitializing the first and second clock signals to reestablish the first phase offset includes reselecting a first clock edge occurring approximately 180 degrees out of phase from the second clock reference edge.

4. The method of claim 3 further comprising:

deriving N second clock signals, one second clock signal for each bank of N registers, with each of the N second clock signals offset from another second clock signal by a time equal to the first frequency's period divided by N;

deriving N first clock signals, one first clock signal for each bank of N registers, with each of the N first clock signals offset from another first clock signal by a time equal to the first frequency's period divided by N;

writing data to each of the N registers in response to its corresponding second clock signal; and reading data from each of the N registers with its corresponding first clock signal.

5. The method of claim 4 further comprising:

generating a fourth clock signal having a frequency N times the first frequency; and in which the generation of the first clock signal includes deriving the first clock signal from the fourth clock signal.

6. The method of claim 5 wherein an interface device is provided, and further comprising:

supplying the fourth clock signal to an interface device;

asynchronously deriving a third clock signal, having a frequency N times the first frequency, from the fourth clock signal;

providing the data to the input of the N registers from the interface device in response to the third clock signal; and deriving the second clock signal from the third clock signal.

7. The method of claim 6 which generation of the second clock signal having the first phase offset includes the first phase offset being 180 degrees with a margin of error less than, or equal to +/−((N−2)/2) periods of the third clock signal frequency.

8. The method of claim 7 which generation of the second clock signal having the first phase offset includes the first phase offset being 180 degrees with a margin of error less than, or equal to +/−((N−4)/2) periods of the third clock signal frequency.

9. A system for transferring asynchronously timed data, the system comprising:

a phase error circuit having a first input to receive a first clock signal with a first frequency, a second input to receive a second clock signal at the first frequency, the phase error circuit measuring a phase offset between the first and second clock signals, the phase error circuit having an output to provide a phase error signal when the phase offset drifts from a first predetermined phase offset; and a data transfer circuit having a first input to write data and a first output for the reading of data, a second output connected to first input of the phase error circuit to supply the first clock signal, a third output connected to the second input of the phase error circuit to supply the second clock signal, and a fourth input connected to the phase error circuit output to accept the phase error signal, the data transfer circuit writing the data with the second clock signal and reading the data with the first clock signal when the phase offset between the first and second clock signals is the first phase offset.

10. The system of claim 9 further comprising:

an interface circuit having a first output connected to the data transfer circuit first input to provide the data to be written.

11. The system of claim 10 in which the interface circuit includes a second output to provide a third clock signal having a frequency that is N times the first frequency, and further comprising:

a clock generator to provide a fourth clock signal having a frequency that is N times the first frequency;

in which the data transfer circuit has a second input connected to the clock generator to accept the fourth clock signal and a third input connected to the interface circuit second output to accept the third clock signal, and in which the first clock signal is derived from the fourth clock signal and the second clock signal is derived from the third clock signal.

12. The system of claim 11 in which the interface circuit has an input to accept the fourth clock signal, the interface circuit asynchronously deriving the third clock signal from the fourth clock signal.

13. The system of claim 12 in which the data transfer circuit includes N banks of registers, each register having a data input connected to the data transfer circuit first input, a data output operatively connected to the data transfer circuit first output, and a clock input to receive the second clock signal, and in which input data is fanned out to the N register inputs, and demultiplexed into the N register inputs and shifted through each register to the output with the second clock signal.

14. The system of claim 13 in which the data transfer circuit includes an N:1 multiplexer (MUX) circuit having N data inputs, each MUX data input being connected to a corresponding registers output, the MUX having a select input to receive the first clock signal and an output connected to the data transfer circuit first output, the MUX multiplexing data to be read from the N register outputs in response to the first clock signal.

15. The system of claim 14 in which the data transfer circuit includes a counter circuit having a first input connected to the data transfer circuit second input to receive the fourth clock signal, a second input connected to the data transfer circuit third input to receive the third clock signal, and a third input connected to the data transfer circuit fourth input to receive the phase error signal, the counter circuit having a first output to provide the first clock signal and a second output to provide the second clock signal, the counter circuit reinitializing the provision of the first and second clock signals to reestablish the first phase offset.

16. The system of claim 15 in which the counter circuit reinitializes the supply of the first and second clock signals so that the first clock signal and second clock signal are 180 degrees out of phase; and in which the phase error circuit reinitializes the measurement of the first phase offset in response to the counter circuit supplying the reinitialized the first and second clock signals.

17. The system of claim 17 in which the phase error circuit measurement of phase offset includes the first phase offset being 180 degrees with a permitted drift that is less than, or equal to +/−(N−2)/2 periods of the third frequency.

18. The system of claim 17 in which the phase error circuit measurement of phase offset includes the first phase offset being 180 degrees with a permitted drift that is less than, or equal to +/−(N−4)/2 periods of the third frequency.

19. The system of claim 17 wherein the MUX has N select inputs to select an output to be read from each of the N registers, and in which the counter circuit comprises:

an initialization circuit having a first input connected to the first input of the counter circuit to accept the fourth clock signal, a second input connected to the second input of the counter circuit to accept the third clock signal, and third input connected to the third input of the counter circuit to accept the phase error signal, the initialization circuit having a first output to provide the first clock reset signal and a second output to provide a second clock reset signal, the initialization circuit providing reset signals in response to the phase error signal;

a write counter having a first input connected to the initialization circuit second output to receive second clock reset signal and a second input connected to the second input of the counter circuit to accept the third clock signal, the write counter dividing the third clock signal by N, to create N second clock signals offset by a time equal to the first frequency's period divided by N, the write counter having N outputs to provide a different second clock signal to each of the N registers, the write counter reinitiating the supply of the N second clocks in response to receiving the second clock reset, providing N second clock signals at a first phase;

a read counter having a first input connected to the first initialization circuit output to receive the first clock reset signal and a second input connected to the first input of the counter circuit to accept the fourth clock signals, the read counter dividing the fourth clock signal by N, to create N first clock signals offset by a time equal to the first frequency's period divided by N, the read counter having N outputs to provide a different first clock signal to each of the N MUX select inputs, the read counter reinitializing the supply of the N first clocks in response to receiving the first clock reset signal, providing N first clock signals at a second phase approximately 180 degrees different than the first phase of the N second clock signals.

* * * * *